May 4, 1948.　　　M. C. GARRETT　　　2,441,017
LIPSTICK HOLDER AND CASING
Filed Oct. 17, 1946
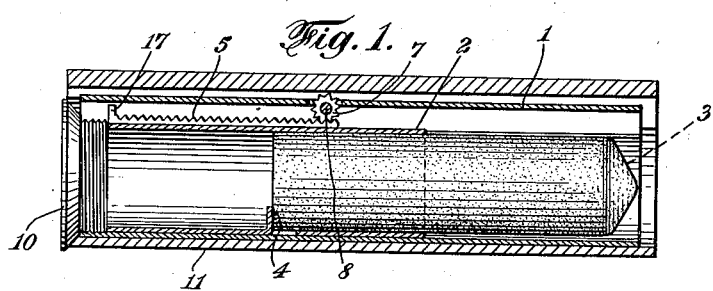
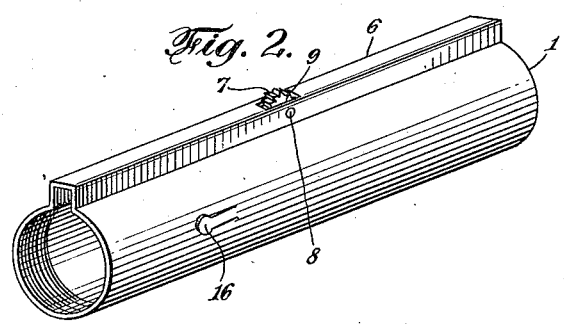
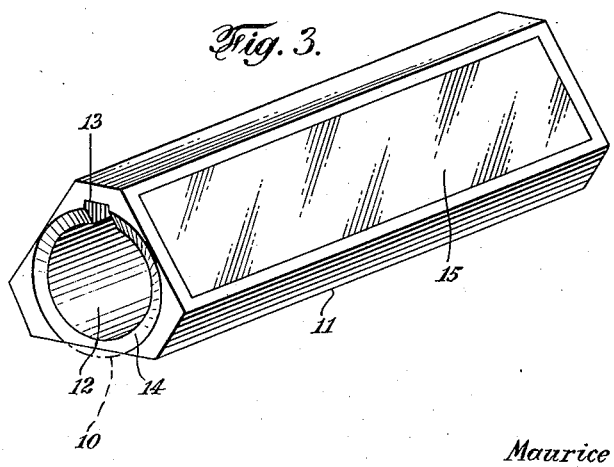
INVENTOR
Maurice Charles Garrett.
BY
William F. Nickel
ATTORNEY Patented May 4, 1948

2,441,017

UNITED STATES PATENT OFFICE 2,441,017

LIPSTICK HOLDER AND CASING

Maurice C. Garrett, New York, N. Y.

Application October 17, 1946, Serial No. 703,801

2 Claims. (Cl. 132—79)

This invention is an improvement in lipstick holders, particularly a holder to which the lipstick is movably attached, so that it can be withdrawn into the holder when it is not needed and projected whenever the owner wishes to put it to the intended use.

An object of the invention is to provide a holder in which the lipstick can be securely held so that it is always in readiness when required, from which the remnant can easily be removed for replacement, and so mounted and engaged in the holder that it can be caused to protrude farther and farther as it is worn and shortened with use, and, when retracted, encased by the holder so that it cannot make contact with other articles in the owner's handbag or pocket.

The nature and advantages of the invention are made clear in the following description and the drawings show a preferred form of the invention. But I do not wish to be limited to the exact construction illustrated, as numerous changes in details can be made without deviation from the subject matter defined in the appended claims.

In the drawings,

Figure 1 is a longitudinal section of a lipstick holder according to my invention, enclosed by a casing therefor.

Figure 2 is a perspective view of the handle or member in which the lipstick is mounted, and Figure 3 shows in perspective the casing designed to receive same.

The numeral 1 comprises a tubular member forming a handle open at one end, and enclosing a sleeve 2 which receives in one end the lipstick 3. This sleeve can be cut and a part 4 defined by the cut bent inward to make a stop to limit the extent to which the stick enters the sleeve 2. Usually more than one half of the stick 3 projects from the front end of the sleeve 2.

Along the outside of the sleeve is a longitudinal toothed rack 5, and when the sleeve is inserted into member 1, this rack fits into a hollow rib 6 extending along the member 1. At one point this rib has a small gear wheel 7 mounted therein. This gear is supported on a shaft 8 engaged by the sides of the rib 6, and is exposed through an opening 9. It meshes with the rack 5, and when turned by the user's finger it actuates the sleeve to move it and project the lipstick 3 so as to expose the extremity beyond one end of the member 1. When the stick is newly inserted in the sleeve 1, it will be fully covered over virtually its whole length when the sleeve is retracted as far as the cap 10, which is screwed into the other end of the member 1.

The handle 1 and lipstick can be stored in a casing 11 having a bore 12, with a longitudinal groove 13 to receive the handle and rib 6. At one end the bore 12 is counterbored or otherwise suitably shaped to form a seat for the cap 10. The casing 11 is prismatic with one or two outside faces polished to form a mirror surface 15. The outside of the handle 1 has a clip 16 made resilient to prevent the member from slipping out of the casing 11, but it can always be pulled out by the owner's fingers.

When the article is to be charged, the member 1 and the sleeve 2 are of course outside of the casing 11. The wheel 7 is turned to move the sleeve 2 and the remnant therein out of the end of the member 1. The remnant is taken out. The lipstick 3 is inserted into the sleeve which is then returned by rotating the wheel 7 to move the rack 5 and sleeve 2 into the member 1. The end of the lipstick is then enveloped by the open end of the member 1, and the cap 10 is then attached. The lipstick can now be projected from the member 1 by turning the pinion 7 and withdrawn by the same means. The member 1 with the sleeve 2 and stick 3 can be inserted at will into the casing 11 and withdrawn when the lipstick is to be put to use merely by forcing it out of the casing 11. This is facilitated because the cap 10 overlaps one face of the casing a little as shown in Figure 3. The mirror surfaces 15 are utilized by the owner instead of the usual small separate hand mirror of the conventional type.

The rack 5 has a stop 17 at the end nearest to the screw cap 10 in the member 1. This stop is a little higher than the rack 5, but slides freely in the rib or guideway 6; but when it reaches the pinion 7, it prevents further outward movement of the sleeve 2 and lipstick 3. The greater part of the lipstick can be consumed and a new one can then be substituted for the short piece remaining.

From the foregoing description it will be seen that my invention is a very useful and handy article well adapted to confer the advantages which are its principal objects.

Having thus described my invention, what I believe to be new is:

1. An article of the kind described comprising a hollow member, a sleeve therein carrying a lipstick projecting from one end, a longitudinal toothed rack on the sleeve, said member having a bore to receive the sleeve and lipstick, the bore having a longitudinal hollow rib to receive the rack, a gear mounted in said rib to engage the rack, said rib having an opening to expose said gear and a cap for closing one end of said member.

2. An article of the kind described comprising a sleeve to engage and retain a lipstick, a member enveloping said sleeve, the latter having a longitudinal rack on its exterior, a gear carried by said member to engage the rack, the gear being exposed to the outside of said member for operation, and a casing having an outside mirrored surface, and a bore to receive said member, said member having a hollow rib to receive the rack, and the bore in the casing having a groove to receive the rib, one end of said member having a cap and the bore in the casing being shaped at one end to fit the cap, the member having a resilient clip to retain it in said casing.

MAURICE CH. GARRETT.

REFERENCES CITED

The following references are of record in the file of this patent:

UNITED STATES PATENTS

| Number | Name | Date |
|---|---|---|
| 1,893,083 | Irelan | Dec. 4, 1934 |
| 2,159,872 | Younghusband | May 23, 1939 |

FOREIGN PATENTS

| Number | Country | Date |
|---|---|---|
| 671,604 | France | Dec. 16, 1929 |